(12) United States Patent
Hummel et al.

(10) Patent No.: US 7,645,527 B2
(45) Date of Patent: Jan. 12, 2010

(54) GYPSUM-BASED BUILDING MATERIAL

(75) Inventors: Hans-Ulrich Hummel, Markt Einersheim (DE); Georg Krämer, Nordhausen (DE); Hans-Rudolf Stössel, Iphofen (DE)

(73) Assignee: Knauf Gips KG, Iphofen (DE)

( * ) Notice: Subject to any disclaimer, the term of this patent is extended or adjusted under 35 U.S.C. 154(b) by 395 days.

(21) Appl. No.: 10/532,635

(22) PCT Filed: Sep. 13, 2004

(86) PCT No.: PCT/EP2004/010208

§ 371 (c)(1),
(2), (4) Date: Sep. 12, 2005

(87) PCT Pub. No.: WO2005/026465

PCT Pub. Date: Mar. 24, 2005

(65) Prior Publication Data

US 2006/0137276 A1    Jun. 29, 2006

(30) Foreign Application Priority Data

Sep. 12, 2003 (EP) .................................. 03020764
Oct. 29, 2003 (EP) .................................. 03024922

(51) Int. Cl.
*B32B 13/00* (2006.01)
(52) U.S. Cl. ..................................... 428/703; 428/131
(58) Field of Classification Search ................. 428/703, 428/131
See application file for complete search history.

(56) References Cited

U.S. PATENT DOCUMENTS 3,862,881 A * 1/1975 Taniguchi et al. ........... 428/149

| 4,564,544 A | 1/1986 | Burkard et al. | |
| 5,494,513 A | 2/1996 | Fu et al. | 106/672 |
| 6,190,440 B1 * | 2/2001 | Purnell | 96/108 |

FOREIGN PATENT DOCUMENTS

| JP | 08-073253 | | 3/1996 |
| JP | 09125538 | * | 5/1997 |
| JP | 2000103002 | | 4/2000 |
| JP | 2001-059281 | | 3/2001 |
| JP | 2001-263749 | | 3/2001 |
| JP | 2001058318 | | 3/2001 |
| JP | 2001146460 | | 5/2001 |
| JP | 2002293600 | | 2/2002 |
| JP | 2002-103510 | | 4/2002 |
| RU | 1997-433441 | | 2/1997 |
| RU | 2074137 | | 2/1997 |
| SU | 601249 | | 3/1978 |
| WO | WO2005/026465 | | 3/2005 |

OTHER PUBLICATIONS

Sagae et al, *Study on a new humidity controlling material using zeolite for building*, Studies in Surface Science and Catalysis (1994). 83 (Zeolites and Microporous Crystals), 251-60 (Abstract only).

(Continued)

*Primary Examiner*—William P Watkins, III
(74) *Attorney, Agent, or Firm*—Thompson Hine LLP

(57) ABSTRACT

A gypsum-based building material containing from 1 to 25% by weight of zeolites.

20 Claims, 2 Drawing Sheets

OTHER PUBLICATIONS

Figure 1:
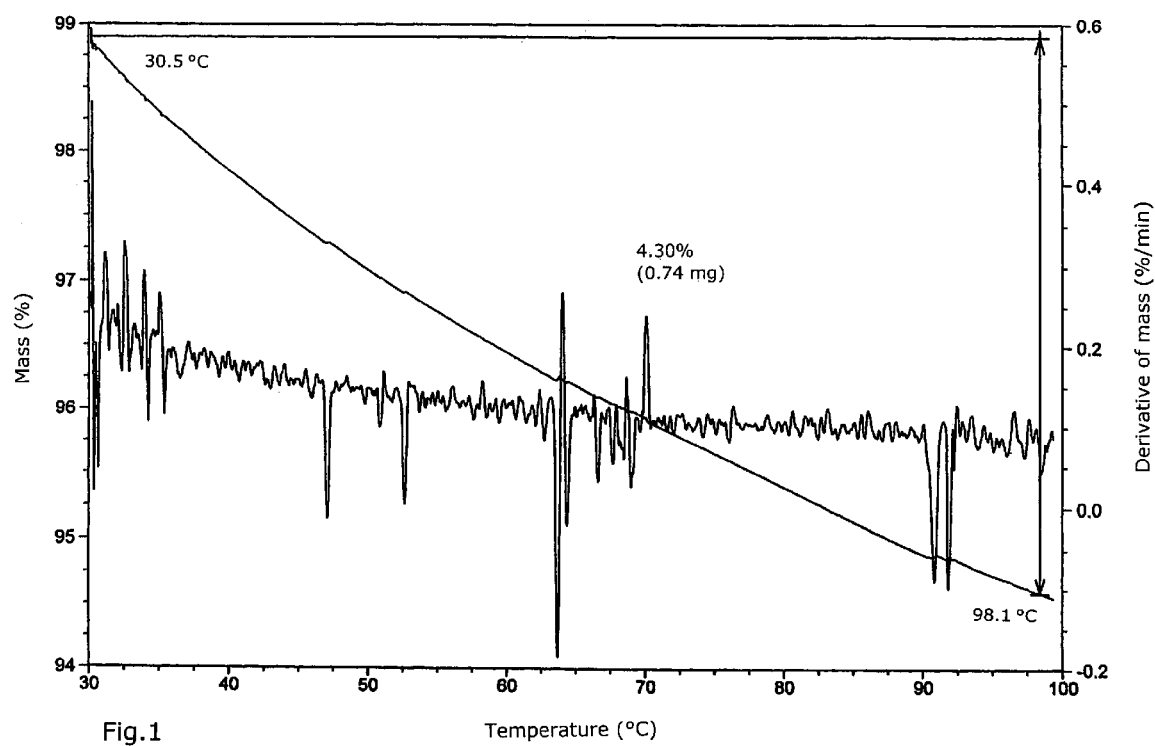

EPO, *European Search Report*, for EP03024922, dated Apr. 26, 2004 (5 pg).

PCT, *International Search Report*, for PCT/EP2004/010208, dated Mar. 16, 2005 (4 pg).

English Translation of the International Preliminary Report on Patentability Translation, PCT/EP2004/010208, mailing date Aug. 31, 2006.

* cited by examiner

GYPSUM-BASED BUILDING MATERIAL

RELATED APPLICATION

This application is the National Stage of International Application No. PCT/EP2004/010208 filed Sep. 13, 2004, which claims the benefit of European Application No. 03020764.1 filed Sep. 12, 2003, and European Application No. 03024922.1 filed Oct. 29, 2003, each of these applications is expressly incorporated by reference herein in its entirety.

Gypsum-based building boards, for example, sandwich-type plaster boards and gypsum fiber-boards, are employed in dry construction for the preparation of floors, walls and ceilings.

Typical gypsum-based building boards have a core of cured calcium sulfate di-hydrate. It is coated with cardboard or non-woven (glass-fiber web). Typical thickness values are 6, 9.5, 12.5, 15 and 20 mm.

For different intended applications, there are different optimized boards, for example, boards having an increased moisture stability, boards having an increased fire resistance or a reduced sound transmission property.

Plasters are coats on raw masonry or raw ceilings made of mortar. In interior construction, they often serve as a substrate for further decoration, and on exterior walls, they serve as protection from weathering.

There are also a wide variety of interior plasters which may be employed without further decoration, i.e., so-called decorative plasters.

It was the object of the present invention to provide building materials having improved properties. Surprisingly, it has been found that gypsum-based building materials which contain from 1 to 25% by weight of zeolites can lead to a reduction of airborne pollutants in interiors. Preferred zeolite contents are at least 5% by weight, more preferably at least 10% by weight, and particularly preferred are the ranges of from 5 to 20% by weight and from 10 to 15% by weight.

The contents are based on the proportion of zeolite in the dried gypsum-containing mass without, for example, cardboard or fibrous content.

According to the invention, it is particularly preferred to employ natural zeolites, i.e., zeolites which are not prepared synthetically (e.g., by reacting $SiO_2$-containing and $Al_2O_3$-containing substances with alkali hydroxides at temperatures of more than 50° C. in an aqueous phase). Thus, naturally occurring zeolites are those which are exploited from deposits.

Suitable zeolites include, in particular, those which have a mineral phase composition selected from the group consisting of clinoptilolite, heulandite, chabasite, phillipsite, morderite and mixtures thereof. Astonishingly, the zeolites can be used not only in thermally activated, i.e., thermally dehydrated, but also in native forms.

In a particularly preferred embodiment, the zeolites are employed in a native form, i.e., without thermal activation or dehydration.

Astonishingly, activation of the zeolites apparently occurs during the preparation/drying of the products. The dehydration of zeolites can be measured, for example, by thermogravimetric analysis (TGA).

FIG. 1 shows a TGA diagram for a naturally occurring zeolite. When the temperature is increased, water is released over an extended range of temperatures. The mass of the sample as a function of temperature and the changes of mass (corresponding to the first derivative) are shown.

Figure 2:
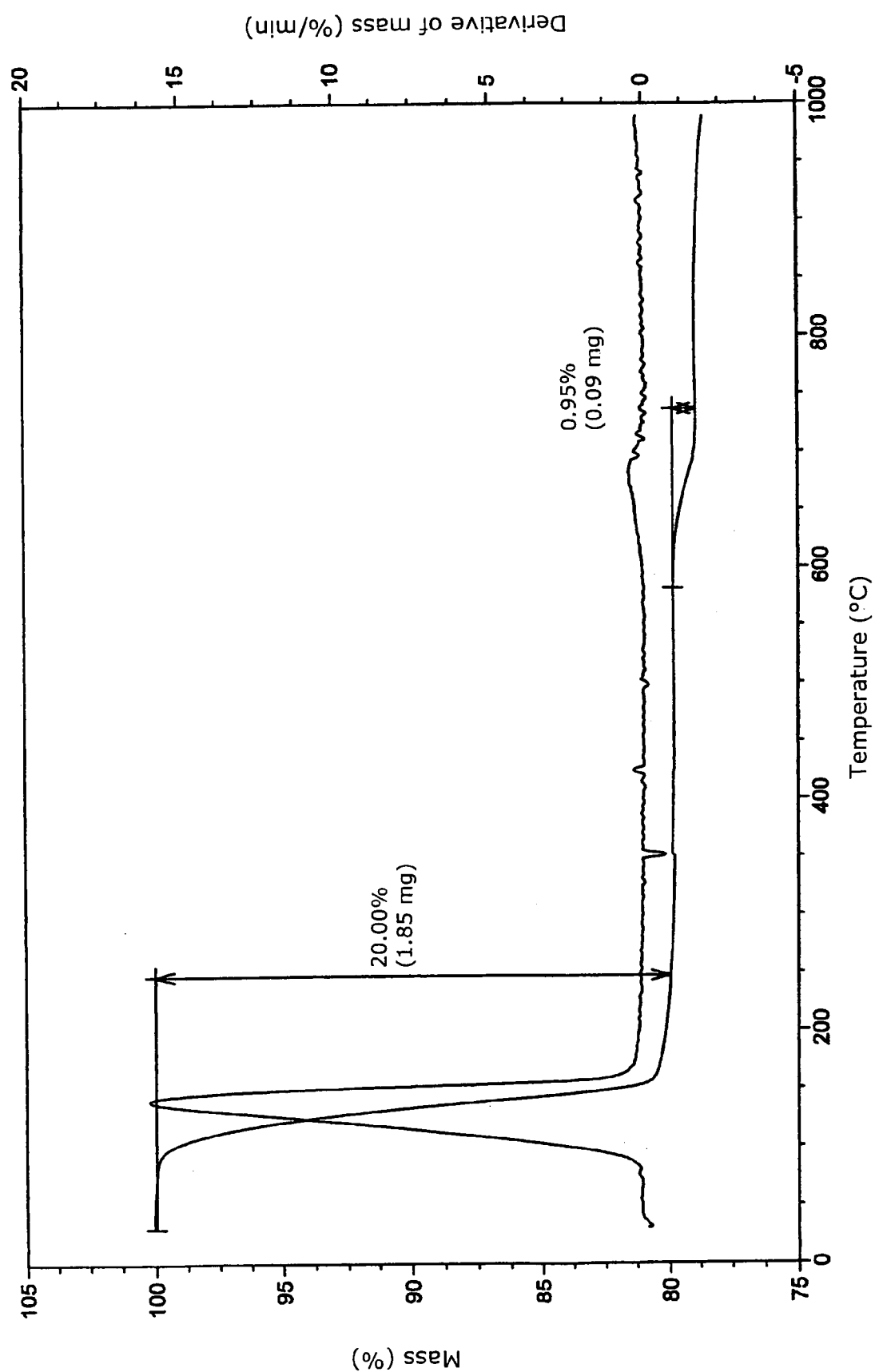

FIG. 2 shows a TGA diagram for a mixture of 90% by weight of stucco and 10% by weight of naturally occurring zeolite. The mixture has been admixed with water and pre-dried at about 40° C. after curing. The amount of water released as found in the TGA analysis corresponds to the amount of water in the gypsum; the water from the zeolite is not found (any longer). The mass of the sample as a function of temperature and the changes of mass (corresponding to the first derivative) are shown.

Nevertheless, such a zeolite shows the activity for the reduction of airborne pollutants as required according to the invention.

The building materials preferably contain zeolites having a grain size of $\leq 200$ μm, preferably smaller than 150 μm. This can be achieved most simply by fine milling.

Particularly suitable zeolites have $d_{50}$ values of from about 30 to about 90 μm, more preferably from 40 to 70 μm.

The zeolites preferably have an oil number (determined in accordance with DIN 53199) of at most 25 g/100 g of zeolite, preferably at most 10 g/100 g of zeolite.

The materials employed according to the invention preferably contain less than 3% of diatomaceous earth, and the zeolites are not admixed with "antibacterial cations".

Particularly preferred building materials are, on the one hand, building boards, especially sandwich-type plaster boards or gypsum fiber-boards, or plasters, especially plasters for applying to interior walls, more preferably decorative plasters, because the admission of air is not hindered by further decoration in this case. The plasters preferably contain the gypsum phase as a binder. The boards are coated, preferably with cardboard or glass fiber web. If desired, they are also perforated (so-called "perforated boards").

For a building board, stucco and zeolites, for example, may be mixed, and the finished board freed from excess water in a continuous dryer.

The gypsum content is preferably at least 30% by weight, more preferably at least 50% by weight, even more preferably 70% by weight or more, respectively calculated on the cured mixture.

The present invention also relates to the use of the building materials according to the invention for reducing airborne pollutants in interiors. Airborne pollutants which can be successfully removed from the interior air include, for example, formaldehyde, benzene, ammonia and tobacco smoke. Also smells, e.g., fishy smell, can be reduced, as could be demonstrated experimentally by the degradation of triethylamine.

Surprisingly, the airborne pollutants are not bound to the materials, but degraded/decomposed, so that no saturation of the materials occurs.

For formaldehyde, the maximum allowable working place concentration (MAK value) is 600 μg/m$^3$. In a room where people smoke, the average formaldehyde content is around 220 μg/m$^3$ for an air-exchange rate of 0.5 changes/hour. The WHO considers a guidance value of 100 μg/m$^3$ for the protection of health. A value to be sought in habitation is about 60 μg/m$^3$.

The average benzene content in a room where people smoke is about 45 μg/m$^3$ for an air-exchange rate of 0.5 changes/hour. A value to be sought in habitation is <10 μg/m$^3$.

By using the building materials according to the invention, correspondingly reduced values can be obtained.

The invention is further illustrated by the following Example.

EXAMPLE

Gypsum-based building boards containing 10% natural zeolites (native, i.e., non-dehydrated) with a grain size of at most 200 μm and a $d_{50}$ value of 40 μm were laid in a room with a normal climate, resulting in 1.23 m² of gypsum board area per 1 m³ of room volume. In this room, a respective noxious gas concentration with the noxious gases formaldehyde and benzene and with a noxious gas mixture from cigarette smoke was adjusted by continuously supplying a defined mixture of noxious gases. The air-exchange rate of the respective mixture was 0.5 changes/hour, i.e., the mixture of noxious substances was renewed completely within two hours. In the exhausted mixture, the remaining concentration of noxious substances was measured as a gas concentration.

By the contact with the gypsum-based building boards, the major part of the noxious gases was degraded, and a concentration of noxious gases in the system was obtained from a starting value (supplied mixture) to an equilibrium value (exhausted mixture)

| for formaldehyde of | 600 μg/m³ | to | 96 μg/m³; |
|---|---|---|---|
|  | 220 μg/m³ | to | 40 μg/m³; |
| for benzene of | 45 μg/m³ | to | <10 μg/m³. |

For cigarette smoke, a substantial reduction of offensive smell from the contact of the smoke with the gypsum-based building boards according to the invention was additionally detected by olfactometry.

In the experimental series, it was additionally established that the noxious substances were not deposited in the gypsum-based building board, but reactively converted to harmless compounds.

Experiments with altered zeolite proportions in the gypsum-based building boards and altered formulations for the gypsum core, for example, with the addition of 5% wood chips, provided similar results.

What is claimed is:

1. An interior finish building material comprising a gypsum-base building material composition for an interior finish, the composition containing from 1% by weight to 25% by weight of a naturally occurring zeolite, wherein the building material is a building board and wherein the building material has less than 3% diatomaceous earth and the naturally occurring zeolite is clinoptilolite.

2. The building material of claim 1 wherein the composition contains at least 5% by weight of the zeolite.

3. The building material of claim 1 wherein the composition contains at least 10% by weight of the zeolite.

4. The building material of claim 1 wherein the composition contains from 5% by weight to 20% by weight of the zeolite.

5. The building material of claim 1 wherein the composition contains from 10% by weight to 15% by weight of the zeolite.

6. The building material of claim 1 wherein said zeolite has a grain size of ≦200 μm.

7. The building material of claim 1 wherein said zeolite has a grain size of ≦150 μm.

8. The building material of claim 1 wherein said zeolite has a $d_{50}$ value of from 30 μm to 90 μm.

9. The building material of claim 1 wherein said zeolite has a $d_{50}$ value of from 40 μm to 70 μm.

10. The building material of claim 1 wherein said zeolite is employed in a native form.

11. The building material of claim 1 wherein the gypsum content is at least 30% by weight.

12. The building material of claim 1 wherein the gypsum content is at least 70% by weight.

13. The building material of claim 1 wherein the zeolite has an oil number of at most 25 g/100 g of zeolite.

14. The building material of claim 1 wherein the zeolite has an oil number of at most 10 g/100 g of zeolite.

15. The building material of claim 1 wherein the zeolites are not admixed with antibacterial cations.

16. The building material of claim 1 wherein the zeolites are mixed with stucco.

17. A method of using the building material of claim 1 to reduce airborne pollutants in interiors.

18. The method of claim 17 wherein said airborne pollutants are selected from the group consisting of formaldehyde, benzene, ammonia, tobacco smoke and mixtures thereof.

19. The building material of claim 1 characterized by being sandwich-type plaster boards or gypsum boards coated with a glass fiber web and optionally being perforated.

20. The building material of claim 1 characterized by being a plaster in which calcium sulfate semihydrate is used as a binder.

* * * * *